United States Patent
Bockus et al.

(10) Patent No.: US 8,271,054 B2
(45) Date of Patent: Sep. 18, 2012

(54) SELECTIVE BATTERY POWER MANAGEMENT

(75) Inventors: Michael Andrew Bockus, Manor, TX (US); Derek Ryan Brewer, Rochester, MN (US); Robert Dale Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 12/946,438

(22) Filed: Nov. 15, 2010

(65) Prior Publication Data

US 2012/0122526 A1    May 17, 2012

(51) Int. Cl.
*H04B 1/38* (2006.01)

(52) U.S. Cl. .................. 455/573; 455/343.2; 455/343.3; 455/343.5; 455/572; 455/574; 320/106; 320/127; 320/132; 345/211

(58) Field of Classification Search .................. 455/572, 455/574, 343.2–343.5; 320/106, 127, 132; 345/211
See application file for complete search history.

(56) References Cited

U.S. PATENT DOCUMENTS

| 5,164,761 | A | | 11/1992 | Osono | |
|---|---|---|---|---|---|
| 5,248,929 | A | * | 9/1993 | Burke | 320/127 |
| 5,654,623 | A | * | 8/1997 | Shiga et al. | 320/106 |
| 6,031,999 | A | | 2/2000 | Ogawa | |
| 6,433,512 | B1 | * | 8/2002 | Birkler et al. | 320/132 |
| 6,876,393 | B1 | | 4/2005 | Yokonuma | |
| 6,947,035 | B1 | * | 9/2005 | Shiraga | 345/211 |
| 7,187,858 | B2 | | 3/2007 | Dowe | |
| 7,459,884 | B2 | | 12/2008 | Sasaki | |
| 7,508,169 | B2 | * | 3/2009 | Miskovic et al. | 320/132 |
| 7,528,576 | B2 | * | 5/2009 | Ukon | 320/132 |

OTHER PUBLICATIONS

Adaptive Power Management for Mobile Hard Drives, IBM Corporation, Storage Systems Division, 5600 Cottle Road, San Jose CA 95193, Jan. 1999.
U.S. Appl. No. 12/648,923 Sb-08a IDS dated Dec. 15, 2011.
U.S. Appl. No. 12/648,923 NFOA dated Dec. 27, 2011.
U.S. Appl. No. 12/646,923 Amendment dated Feb. 29, 2012.
U.S. Appl. No. 12/648,923 Notice of Allowance dated Apr. 4, 2012.

* cited by examiner

*Primary Examiner* — Steve D Agosta
(74) *Attorney, Agent, or Firm* — David A Mims, Jr.; Robert V. Wilder

(57) ABSTRACT

A method, programmed medium and system are disclosed which provide for user-controlled management of power requirements for mobile devices. The system enables the user to determine and adjust power settings according to time-related goals set by the end user. The end user, in one example, may specify a goal in hours, minutes or a predetermined date/time and the power management function displays, for example, various combinations of power-down options on specific system devices which can be implemented to achieve power availability for the specified amount of time. The user is enabled to select which of the displayed combination power-down option schemes to implement in order to best suit the user's application requirements during the time frame in which the power-saving scheme will be implemented in order to maximize power-saving while still providing optimum functionality for the user's particular application.

16 Claims, 3 Drawing Sheets

SELECTIVE BATTERY POWER MANAGEMENT

FIELD OF THE INVENTION

The present invention relates generally to information processing systems and more particularly to a methodology and implementations for enabling improved power management for mobile devices.

RELATED APPLICATIONS

The present application is related to co-pending patent application AUS920090243US1, which is assigned to a common assignee and included herein by reference.

BACKGROUND OF THE INVENTION

Users of wireless devices are becoming more dependent on the functionality provided by mobile or wireless devices such as phones, laptop computers and other similar devices. Such functionality includes, inter alia, phone, email, text messaging, internet browsing, GPS navigation, GPS tracking, cameras and music/picture/video players. Running out of power for these mobile devices is unacceptable.

Users are always scrambling to plug-in their devices for re-charging or having to purchase and carry extra batteries. The ultimate devices are ones that can be trusted to operate for long periods of time and can provide a level of certainty that enough power will be available when needed.

Battery life is an important consideration when using electronic devices such as digital cameras, laptop computers, personal digital assistants (PDAs), etc. Typically, most individuals do not have spare batteries for such devices on hand and thus need to make sure there is enough battery life left, for example, for taking a set number of pictures or enough battery life to finish up a project on a laptop computer or other wireless device.

Most of today's mobile devices provide battery level indicators (usually three to five "bars"). However, this does not accurately reflect how long this device will remain operational. Additionally, how long each bar lasts is different depending on whether power consuming components like disks or wi-fi or other power-consuming functions are being utilized. A further complicating factor is that three bars on one device is not the same as three bars on another device and a power bar does not give any real assurance that a certain amount of power will be available when needed since no consideration is given to the type or number of applications that will be run on any particular wireless device.

Some users also buy extra batteries to ensure they can continue to operate when the current batteries run out. However, there are disadvantages to using this method. Users need to ensure that the second battery is charged when needed. Changing batteries means powering down the device before the second battery can be installed. Lastly there's the cost disadvantage of expensive batteries and challenge of misplacing them. Others users will carry power adapters with them. However finding an appropriate sitting area close to a power adapter can be difficult, if not impossible.

In some systems, users can select from a list of profiles (optimized, performance, automatic, presentation, etc.). Using one of these profiles users can prolong the life of the battery by dimming the display, turning off the drive, or automatically putting the device on stand-by mode when it is not used within a certain period of time. While this technique is useful for prolonging the battery life in laptop computers, it does not define a goal time for how long the device will continue to run, especially smaller battery-operated wireless devices.

Further, the above-noted power-conserving schemes do not take into account how the user is operating or intends to operate the device, i.e. in a high power-consuming function or a low power-consuming function. Thus, with pre-set, automatically imposed power-saving schemes, a user is still unable to control the particular power-saving scheme to best suit the particular application which will be used and of which only the user is aware. For example, in one pre-set power-saving scheme, when a battery level is detected to be approaching a certain level, the display may automatically be dimmed to a lower power-consuming state in order to allow the battery power to be available for a longer period of time. However, the user at the time, may be in a dimly-lit environment or be working on a detailed graphics program, and will need all of the screen illumination available. In such a situation, the user may prefer to lower the power level of other power consuming functions which he or she is not using or does not need rather than lowering the illumination level of the display. Thus, even currently available power saving systems fall short of providing an optimum power-saving solution for a broad range of applications.

Accordingly, there is a need to provide an improved power management processing system which is designed to avoid the problems set forth above.

SUMMARY OF THE INVENTION

A method, programmed medium and system are disclosed which provide for user-controlled management of power requirements for mobile devices. The system enables the user to determine and adjust power settings according to time-related goals set by the end user. The end user, in one example, may specify a goal in hours, minutes or a predetermined date/time and the power management function displays, for example, various combinations of power-down options on specific system devices which can be implemented to achieve power availability for the specified amount of time. The user is enabled to select which of the displayed combination power-down option schemes to implement in order to best suit the user's application requirements during the time frame in which the power-saving scheme will be implemented in order to maximize power-saving while still providing optimum functionality for the user's particular application.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
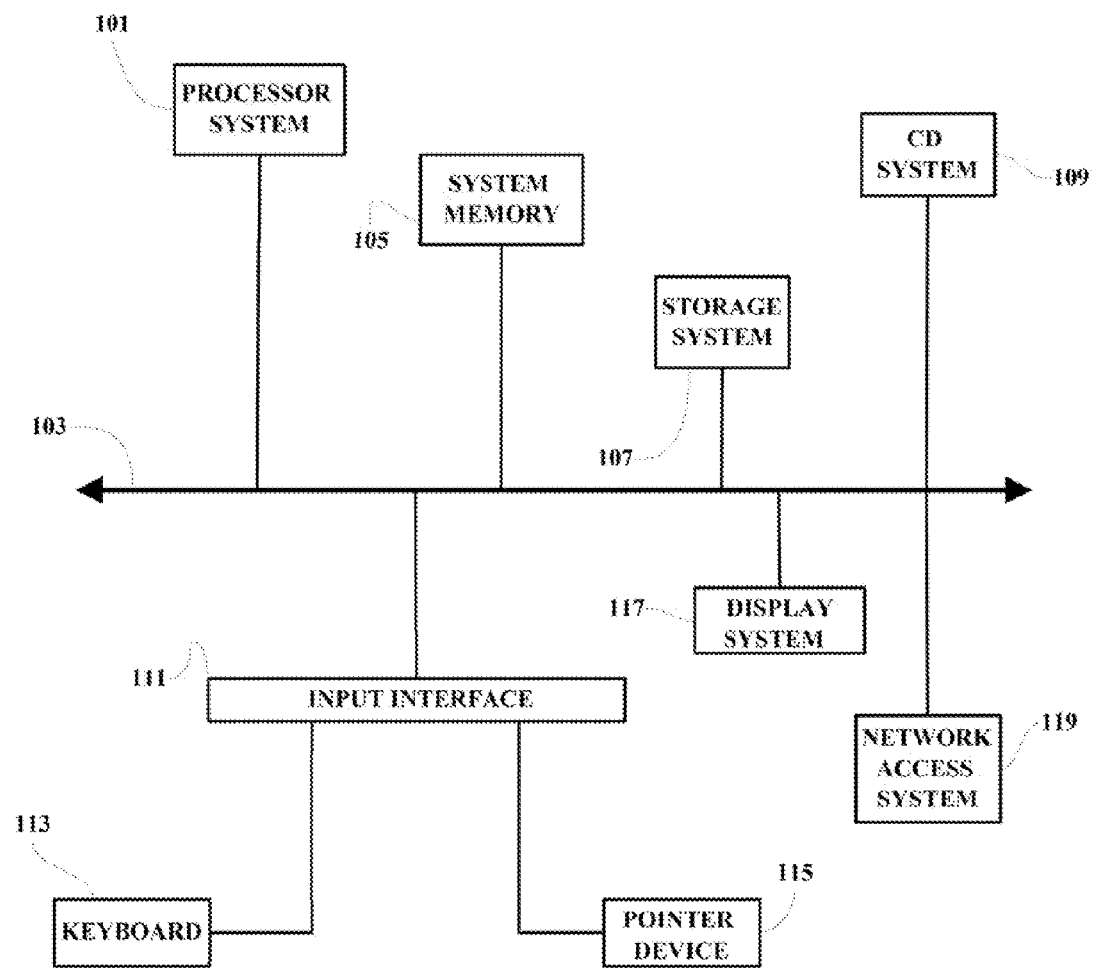
FIG. 1 is an illustration of one embodiment of a system in which the present invention may be implemented.

The various methods discussed herein may be implemented within a computer system which includes, inter alia, processing means, memory, storage means, input means and display means. Since the individual components of a computer system which may be used to implement the functions used in practicing the present invention are generally known in the art and composed of electronic components and circuits which are also generally known those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked laptop computer system or wireless device, it is understood that disclosed methodology may also be applied in many other available and future devices and systems such as cell phones and personal wireless and other hand-held devices, including any input device, including touch-sensitive screens or touch-sensitive input pads, to achieve the beneficial functional features described herein.

The system provides for a method for a user to prioritize execution on power sensitive devices (laptops, handhelds, etc) based upon an application's defined importance to a user. Applications use different amounts of power based upon resources they access (CPU, audio, video, radio, storage). As battery power drains the typical response of the OS is to warn the user to plug-in or shutdown. When power goes to a certain threshold the OS may shutdown or hibernate or just close when the power is drained.

The disclosed system describes a procedure wherein a battery-powered device is needed for a certain amount of time. The system allows a desired time frame to be entered into the device. The life of the battery running in all different modes is determined before hand so that an algorithm can be followed to first determine if it is possible for the battery to last for the desired amount of time. Once it is determined that the battery will last, logic is followed to decide which components of the device need to be either turned off or set to run at less power in order to achieve the needed battery life. Power savings are achieved, inter alia, by lowering the LCD screen's brightness or turning it off, disabling auto-zoom, reducing the clock speed of a CPU, etc. Once it is determined whether some or any components can be disabled to achieve the user's time goals, a list of various combinations of power-down levels and devices is presented to the user and the user is enabled to select which devices and/or schemes is most compatible with the applications which the user intends to operate during the user-determined period of time.

This method allows a user of an electronic device the ability to enter in a desired time for a device's battery to last and the device itself determines first if it is even possible at all, then if it is possible, what components of the device may be shut off or inhibited to meet the desired time. When it is determined that an electronic device's battery is needed for a certain amount of time, this desired time frame will be entered into the device. The life of the battery running in all different modes needs to be determined before hand so that a process can be followed to first determine if it is possible for the battery to last for the desired amount of time. Once it is determined that the battery will last, logic is followed to decide which components of the device need to be either turned off or set to run at less power in order to achieve the needed battery life. These items can be to lower the LCD screen's brightness or turn it off, disable auto-zoom, reduce the clock speed of a CPU, etc. Once it is determined whether some or any components need to be disabled, a list is presented to the user and the user can select which devices can be powered down or shut-off depending upon which functions are most important for the particular applications the user plans to run during the designated time period.

In one example, if it is known that 30 minutes of video need to be recorded, the user can enter this in a menu. If the camera's battery is twenty-five percent (25%) charged, it is determined that the camera's LCD screen needs to be shut-down in order to be able to record the full thirty minutes of video. This can also be used as a simple check before attempting to record a video to determine if the battery needs to be charged beforehand or not. In another example, if a user has to complete a very important presentation using his or her laptop computer, and needs forty-five minutes of assured battery power to complete the work on the laptop computer, the user is enabled to enter the forty-five minute period as a requirement. If the laptop battery is charged to only thirty percent at the time, a diagnostic routine determines that one combination of power-down scenarios indicates that the display brightness needs to be lowered and that the sound, network, and MP3 music player need to be turned off in order to obtain the forty-five minutes of work on the presentation. Another combination presented to the user may indicate that the sound, network, MP3 music and CD player need to be turned off in order to obtain the forty-five minutes of work on the presentation. In this situation, the user would select the second option since he/she will not be using the CD player but desires to have full brightness on the display while he/she is preparing the presentation.

In another exemplary application, if a user needs to record video for a set amount of time or take a certain number of still pictures, it is unknown whether or not the battery will last long enough to do so. In that case, the user can estimate the time available and possibly shut down components of the camera manually, but the user may still not know if the battery will last. By entering the amount of time, the user can get a real-time answer as to whether or not the battery will last and if so, what if any, components need to be disabled to meet the desired goals.

FIG. 1 illustrates an exemplary environment in which the present invention may be implemented. As shown, a processor system 101 is connected to a main bus 103. The main bus 103 is also coupled to, inter alia, system memory 105, a local storage system 107, a CD drive 109, and an input interface 111. The input interface 111 is arranged to receive user inputs from a keyboard 113 or a pointer device 115 such as a mouse. The main bus 103 is also connected to a display system 117 and a network access system 119. The input and/or display system may also comprise a touch-sensitive screen or optically-sensitive input pad (not shown). Additional devices and bus systems, which are not shown, may also be coupled to the system main bus 103.

Figure 2:
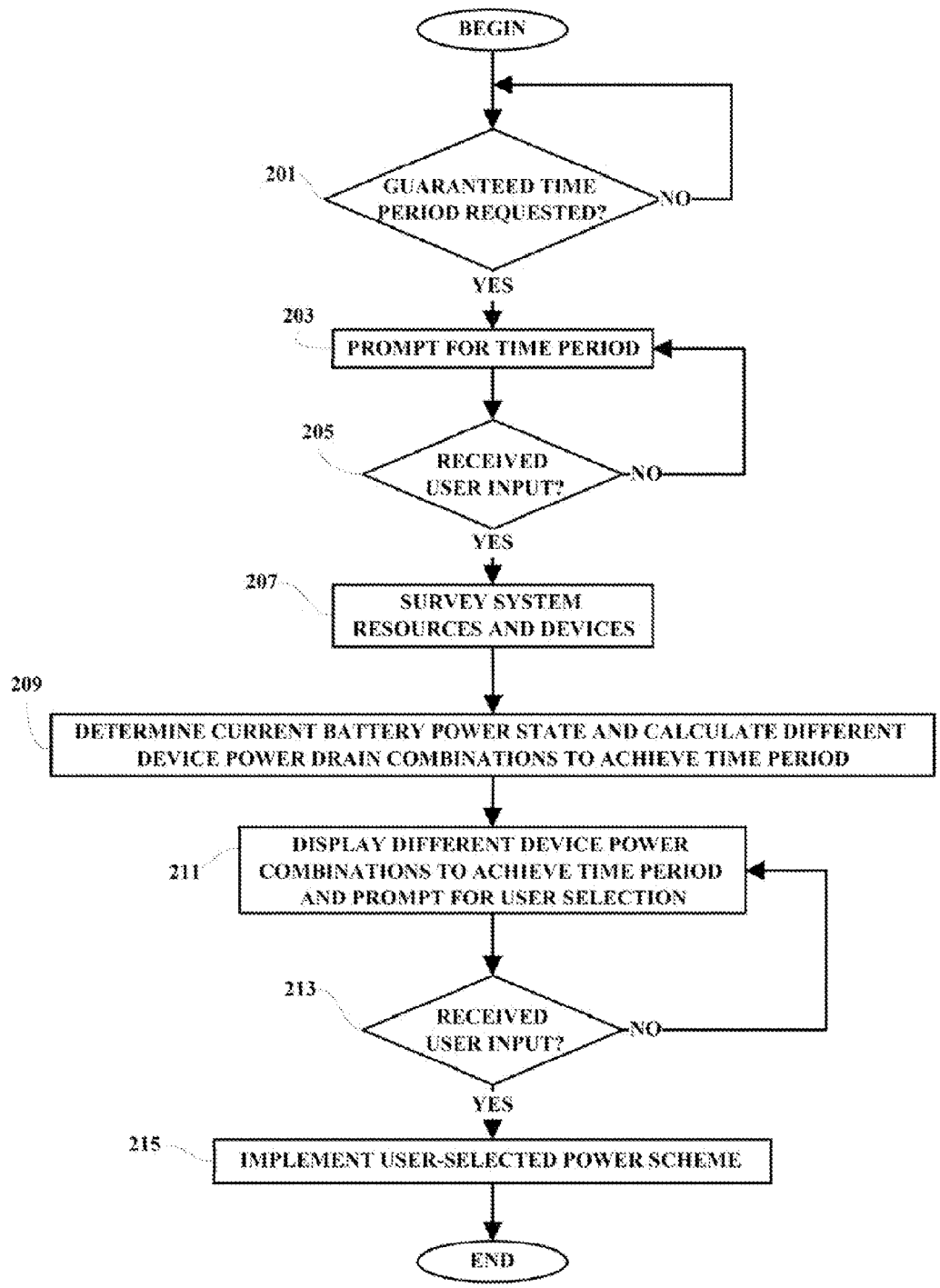
FIG. 2 is a flow chart illustrating an exemplary sequence of operations in one embodiment of the present invention.

In FIG. 2, there is shown a flow chart illustrating an exemplary sequence of operations in one embodiment of the present invention. As illustrated, when a user requests a guaranteed time period 201 during which the device must remain powered by the battery, the system prompts the user 203 to input the user's desired time period. When an input is received from the user 205, the system surveys the user's system resources and devices 207. This generally includes all power consuming resources available to the system, including, but not limited to, the processor or processors in a multi-processor system, the display device, the Internet or other network access resource, CD drives and other applications such as an audio player which may be able to run in the background and consume power. Any available power consuming devices and/or applications available to the system are surveyed to determine how much power each consumes under different operating conditions. For example, a display device may have three levels of brightness 80%, 90% and 100%, and the device will consume a different amount of power at each level. For a given application which the user may need to use for the guaranteed time period, a brightness level of only 80% may be needed and the user can so specify as hereinafter explained in greater detail.

Figure 3:
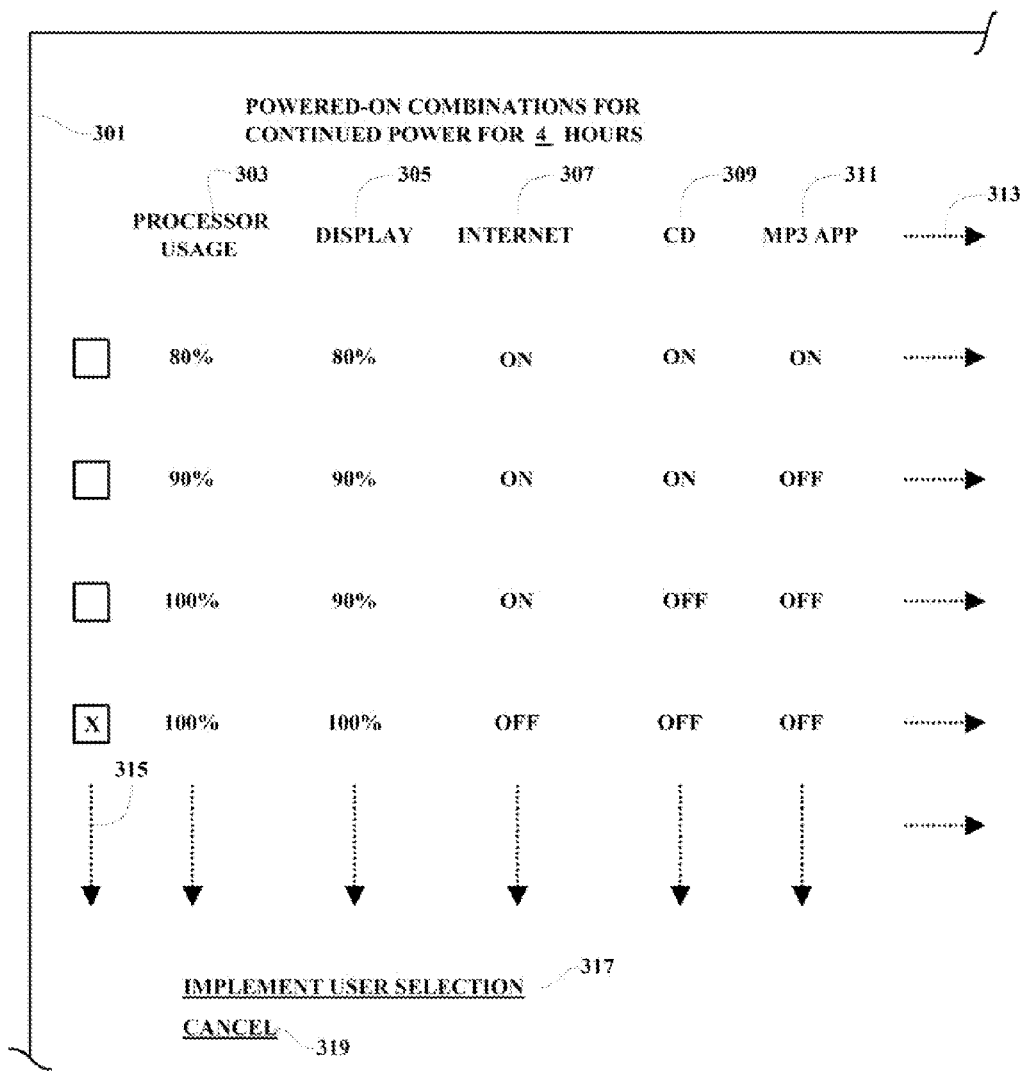
FIG. 3 is an illustration of an exemplary display presentation to enable user selection of a user-preferred power saving implementation.

Next, the current state of charge for the system battery is determined and the system calculates 209 a schedule of different, device power drain combinations any of which may be implemented to achieve the desired guaranteed time period. For example, such a schedule is illustrated in FIG. 3. The schedule of possible device power settings is presented 211 on a display device for the user to select which combination the user would prefer to implement based upon the needs of the particular application which the user intends to use during the guaranteed time period. For example, if time is of the essence, the user may wish to select a combination which makes the best use of the processor or processors of the system. If screen visibility is required in the user's particular operating environment, then the user may wish to select a device combination which includes a 100% powered-on display device. The user will then select and input the combination of devices and power levels (e.g. FIG. 3) most needed for the user's particular application 213 and the system will then implement 215 the combination selected by the user in order to guarantee the battery powered condition for the requested time period of operation. In some cases, the schedule may indicate that no combination or only one combination can be implemented to achieve the requested time period of operation. In any event, the present system enables the user to select which combination of devices and/or applications are running and at what power level in order to best suit the particular application and environment of the user for the requested guaranteed time period.

An exemplary device powered-on schedule is illustrated in FIG. 3. The schedule is displayed to the user on a display device screen 301 and includes the time or number of hours which will be accommodated together with various combinations of devices and operating power levels for the devices. Information related to device operating power levels is readily available from device manufacturers and may be assembled in database or other format for access by the system in creating the FIG. 3 schedule. The exemplary illustration includes devices such as the processor(s) usage 303, display power level 305, Internet Access program 307, CD or other drive 309, and an MP3 application 311. The devices listed may include more than those shown 313 and additional combinations may be presented 315. Several of the devices have graduated power level settings such as the display device 305 while other devices and/or applications are shown either in an ON or an OFF state. In the example, the user selects the combination desired and inputs an "X" in the appropriate box, then "clicks" on an "Implement" selection 317 to implement the power settings for the selected combination to achieve the desired four hours of guaranteed power. The user may also choose not to implement any of the settings 319 and continue operating without a guaranteed battery powered-up time period. In another exemplary embodiment, the user is enabled to change the time desired for guaranteed power and as the user enters a different number of hours for example, the displayed device powered-up schedule would change immediately to show the user the different options available for different powered-up time periods.

It is noted that different devices have different power needs at different points in time. The utilization of the devices can be monitored and depending on the power consumption of the device, available power can be lowered or increased. For example if the wireless network is not utilized a lot there is no need to have the antenna working on highest power. The power supplied to the antenna can be lowered depending on the network utilization. This is another example of how the present system can help save power in order to extend the period for which battery power is made available. In other examples, a user is enabled by the system to define properties in the power management tool to automatically change the Wi-Fi antenna from Max performance to Normal performance (thus using less power) thereby enabling the use of other devices to a higher power level for a given application.

Thus, there has been provided a method, programmed medium and system which enable user-controlled selection of power management schemes in mobile devices in order to provide a guaranteed amount of battery-up operating time for the user's device.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a computer program product comprising a computer-readable, tangible storage device(s) and computer-readable program instructions stored on the computer-readable, tangible storage device(s) in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing power management in a mobile device designed to be powered by a battery, said method comprising:
   providing user input means for receiving user input specifying an operating time desired by said user for said mobile device to maintain sufficient battery life for a continued operation of said mobile device during said operating time;
   determining current battery charge of said battery;
   determining device resources available for use by said mobile device;
   determining power consumption rates for said device resource;
   determining a schedule of combinations of said device resources and associated power consumption rates which would allow an operation of said mobile device for said operating time;
   displaying said schedule on a display device to said user; and
   providing input means to enable said user to select any one of said combinations whereby said mobile device is able to continue to operate during said operating time using said selected one of said combinations of device resources and associated power consumption rates wherein at least one of said device resources is able to run at one of several different power consumption rates.

2. The method as set forth in claim 1 wherein one of said power consumption rates is zero indicating a non-powered state of said associated device resource.

3. The method as set forth in claim 1 wherein one of said device resources is a display unit of said mobile device.

4. The method as et forth in claim 3 wherein said display unit is able to run at one of several different power consumption rates.

5. The method as set forth in claim 1 wherein one of said device resources is a software application configured to run on said mobile device.

6. The method as set forth in claim 1 wherein one of said device resources is a CD drive unit.

7. The method as set forth in claim 1 wherein one of said device resources is a network access application.

8. The method as set forth in claim 1 wherein one of said device resources is a processor system.

9. The method as set forth in claim 1 wherein one of said device resources is an antenna system capable of being powered at one or more power levels.

10. The method as set forth in claim 1 wherein one of said device resources is an audio player capable of playing audio output at one or more power levels.

11. A computer program product comprising a computer-readable, tangible storage device(s) and computer-readable program instructions stored on the computer-readable, tangible storage device(s) to process power management in a mobile device designed to be powered by a battery, the computer-readable program instructions, when executed by a processor system:
   provide user input means for receiving user input specifying an operating time desired by said user for said mobile device to maintain sufficient battery life for a continued operation of said mobile device during said operating time;
   determine current battery charge of said battery;
   determine device resources available for use by said mobile device;
   determine power consumption rates for said device resources;
   determine a schedule of combinations of said device resources and associated power consumption rates which would allow an operation of said mobile device for said operating time;
   display said schedule on a display device to said user; and
   provide input means to enable said user to select any one of said combinations whereby said mobile device is able to continue to operate during said operating time using said selected one of said combinations of device resources and associated power consumption rates wherein at least one of said device resources is able to run at one of several different power consumption rates.

12. The computer program product as Set forth in claim 11 wherein one of said power consumption rates is zero indicating a non-powered state of said associated device resource.

13. The computer program product as set forth in claim 11 wherein one of said device resources is a display unit of said mobile device.

14. The computer program product as set forth in claim 13 wherein said display unit is able to run at one of several different power consumption rates.

15. The computer program product as set forth in claim 11 wherein one of said device resources is a software application configured to run on said mobile device.

16. A mobile device enabled for processing power management in said mobile device, said mobile device being designed to be powered by a battery, said mobile device comprising:
   user input device for receiving user input specifying an operating time desired by said user for said mobile device to maintain sufficient battery life for a continued operation of said mobile device during said operating time;
   battery charge measuring device for determining current battery charge of said battery;
   a processing device for determining device resources available for use by said mobile device;
   a power consumption determining device for determining power consumption rates for said device resources wherein at least one of said device resources is able to run at one of several different power consumption rates;
   said processing device being operable for determining a schedule of combinations of said device resources and associated power consumption rates which would allow an operation of said mobile device for said operating time, wherein one of said power consumption rates is zero indicating a non-powered state of said associated device resource; and
   a display device for displaying said schedule on a display device to said user, said user input device being configured to enable said user to select any one of said combinations whereby said mobile device is able to continue to operate during said operating time using said selected one of said combinations of device resources and associated power consumption rates.

* * * * *